(12) United States Patent
Robertson, Jr. et al.

(10) Patent No.: US 8,740,558 B2
(45) Date of Patent: Jun. 3, 2014

(54) EXTERNAL THREADED MOUNT ATTACHMENT FOR FAN CASE

(75) Inventors: Thomas J. Robertson, Jr., Glastonbury, CT (US); Darin S. Lussier, Berlin, CT (US)

(73) Assignee: United Technologies Corporation, Hartford, CT (US)

( * ) Notice: Subject to any disclaimer, the term of this patent is extended or adjusted under 35 U.S.C. 154(b) by 608 days.

(21) Appl. No.: 13/097,339

(22) Filed: Apr. 29, 2011

(65) Prior Publication Data

US 2012/0275913 A1 Nov. 1, 2012

(51) Int. Cl.
 *F01D 25/00* (2006.01)
 *F04D 29/40* (2006.01)

(52) U.S. Cl.
 USPC .................. 415/200; 415/213.1; 415/220

(58) Field of Classification Search
 CPC ..... F01D 25/243; F01D 25/28; F01D 25/285; F02C 7/32; F05D 2260/31
 USPC .............................. 415/200, 213.1, 220, 223
 See application file for complete search history.

(56) References Cited

U.S. PATENT DOCUMENTS

| | | | |
|---|---|---|---|
| 4,734,007 A | | 3/1988 | Perry |
| 5,127,794 A | | 7/1992 | Burge et al. |
| 5,226,789 A | | 7/1993 | Donges |
| 5,295,773 A | * | 3/1994 | Amoroso ..................... 411/80.2 |
| 6,206,633 B1 | | 3/2001 | Nakamura et al. |
| 8,142,144 B2 | * | 3/2012 | Porte et al. .................... 415/200 |
| 8,579,078 B2 | * | 11/2013 | Hurlin et al. .................. 181/288 |
| 2011/0123323 A1 | * | 5/2011 | Ruberte Sanchez et al. . 415/200 |

* cited by examiner

*Primary Examiner* — Dwayne J White
(74) *Attorney, Agent, or Firm* — Carlson, Gaskey & Olds, P.C.

(57) ABSTRACT

An example composite fan case assembly includes a composite fan case body disposed on an axis. The fan case body has a radially inner surface and a radially outer surface. There is at least one mounting attachment to receive a threaded member. The at least one mounting attachment includes a base component and a spool component. The base component extends through an opening in the fan case body from the radially outer surface and toward the radially inner surface of the fan case body. The base component including a base portion, a boss having a non-cylindrical profile, and a cylindrical portion. The mounting attachment also includes a spool component disposed on the radially outer surface and attached to the base component. The spool component receives at least a portion of the base component. An outer surface of the cylindrical portion and an inner surface of the spool component are threaded and correspondingly mate to lock the spool component relative to the base component.

20 Claims, 4 Drawing Sheets

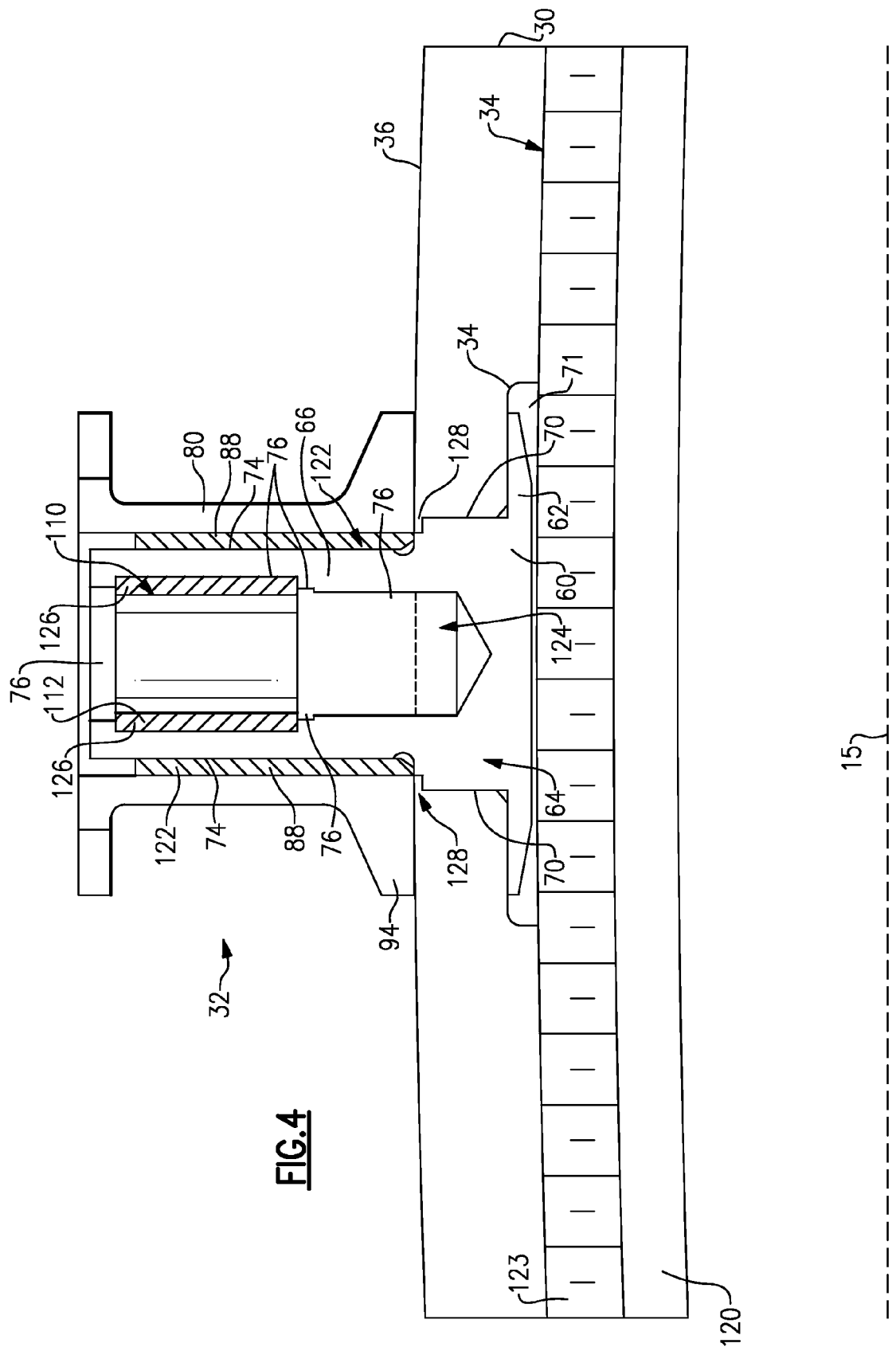

US 8,740,558 B2

EXTERNAL THREADED MOUNT ATTACHMENT FOR FAN CASE

BACKGROUND

This disclosure relates to creating mount attachments for external components in a composite fan case for a gas turbine engine.

Gas turbine engines are known, and typically include a fan which delivers air to a compressor. Recent developments in turbine engines include fabricating a fan case surrounding the fan formed of a composite material, such as carbon fiber reinforced plastic.

Fan cases made of composite materials have many desirable characteristics, however attaching components to the composite material through traditional threaded fasteners is not practical and may compromise structural capability. The material utilized to form the fan case has also not been conducive to fastener maintainability.

SUMMARY

These and other features disclosed herein can be best understood from the following specification and drawings, the following of which is a brief description.

An example composite fan case assembly includes a composite fan case body disposed on an axis. The fan case body has a radially inner surface and a radially outer surface. There is at least one mounting attachment to receive a threaded member. There are at least one mounting attachments including a base component and a spool component. The base component extends through an opening in the fan case body from the radially outer surface and toward the radially inner surface of the fan case body. The base component including a base portion, a boss having a non-cylindrical profile, and a cylindrical portion. The mounting attachment also includes a spool component disposed on the radially outer surface and attached to the base component. The spool component receives at least a portion of the base component. An outer surface of the cylindrical portion and an inner surface of the spool component are threaded to lock the spool component relative to the base component.

An example mounting attachment for a composite fan case assembly in a gas turbine engine includes a base component, a spool component, a helical insert, and a threaded member. The base component extends through an opening in a fan case. The opening is from a radially outer surface and toward a radially inner surface of the fan case. The base component includes a base portion having a circular profile, a boss having a non-cylindrical profile, and a cylindrical portion. The spool component is disposed on the radially outer surface and attached to the base component. The spool component has a first end in contact with the fan case and a second end radially outward of the first end. The spool component has a threaded inner surface receiving at least a portion of a threaded outer surface of the cylindrical portion to lock the spool component relative to the base component. The helical insert has a threaded outer surface received by a threaded inner surface of the base component to lock the helical insert relative to the base component. The threaded member extends through the helical insert and inner surface of the base component and attaches an accessory to the second end of the spool component.

An example method of attaching a mounting attachment to a composite fan case in a gas turbine engine includes inserting a base component into the composite fan case, wherein a base portion and a non-cylindrical boss extending radially outward of the base portion are disposed between an inner surface and an outer surface of the composite fan case. A spool component having a threaded inner surface is mated with a threaded outer surface of a cylindrical portion of the base component. The cylindrical portion extends radially outward of the boss. A helical insert having a threaded outer surface is mated onto a threaded inner surface of the base component.

BRIEF DESCRIPTION OF THE DRAWINGS

FIG. 4 is a cross sectional view of the example containment case and example mount attachment.

DETAILED DESCRIPTION

Figure 1:
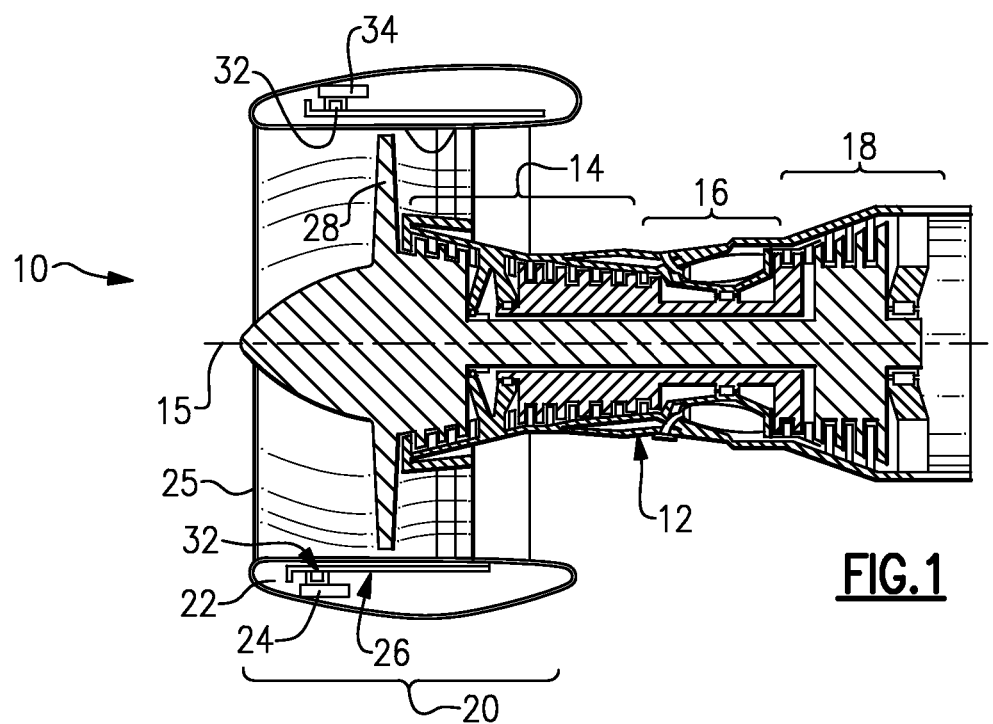
FIG. 1 is a schematic view of an example gas turbine engine.

Referring to FIG. 1, a gas turbine engine is schematically indicated at 10 and includes a core 12 having a compressor section 14, a combustion section 16 and a turbine section 18. The example gas turbine engine 10 includes a fan section 20 that is disposed within a nacelle 22 and includes a plurality of fan blades 28. The compressor, combustion, turbine, and fan sections 14, 16, 18 and 20 are arranged about an axis 15. As is well known in the art, air from the fan blades 28 is compressed in the compressor 14, mixed with fuel and burned in the combustion section 16 to drive the turbine 18. The nacelle 22 defines an inlet 25 for incoming airflow. A fan case assembly 26 is disposed proximate to the blades 28 within the fan section 20. The example fan case includes mount attachments 32 disposed at least partially in the fan case for mounting external components 24, shown schematically, such as electrical boxes or other known external components 24.

Figure 2:
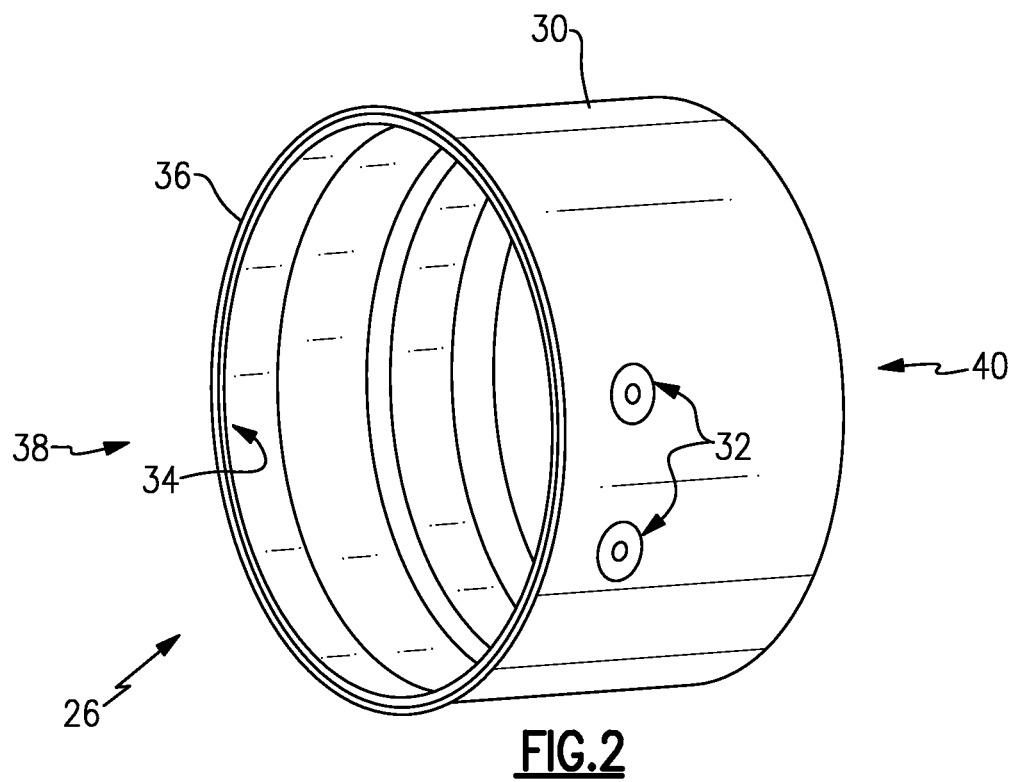
FIG. 2 is a perspective view of an example containment case.

Referring to FIG. 2, the example fan case assembly 26 includes a generally cylindrically shaped fan case 30 that extends between an open front end 38 and an open rear end 40. The example fan case 30 is made of a composite substrate, such as carbon and epoxy. However, it is within the contemplation of this disclosure for other composite or metallic substrates to be used. The mount attachment 32 is secured onto the fan case 30 at the generally forward end or aft end of the fan case 30 and is disposed between an inner surface 34 and an outer surface 36 of the composite fan case 30. The example mount attachments 32 extend radially outward from the fan case 30 to provide connection to external components 24 (shown in FIG. 1). As appreciated, other mount attachment 32 locations and arrangements could be utilized and are within the contemplation of this disclosure.

Figure 3C:
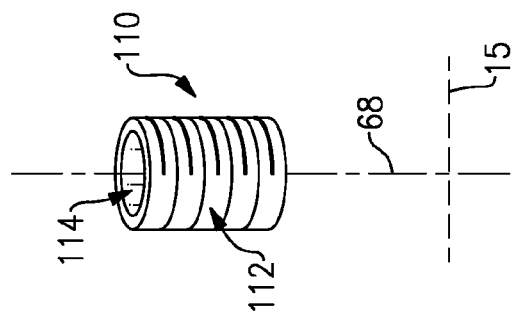
FIG. 3C is a perspective view of an example helical insert.
Figure 3B:
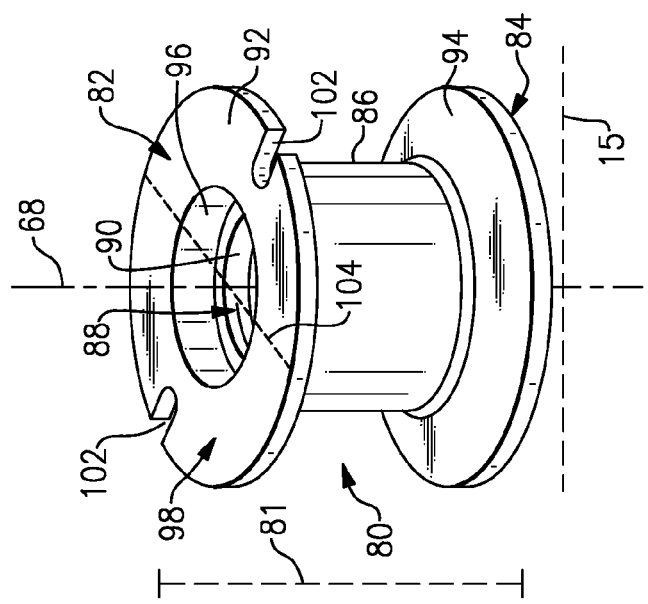
FIG. 3B is a perspective view of an example spool component.
Figure 3A:
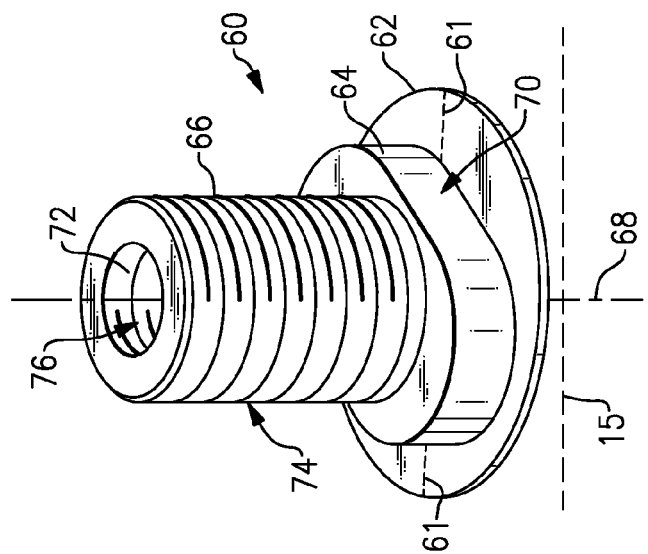
FIG. 3A is a perspective view of an example base component.

Referring to FIG. 3A, with continued reference to FIG. 2, the mount attachment 32 includes a base component 60 having a base portion 62, a boss 64, and a cylindrical portion 66. In one example, the base portion 62 is generally circular and has a diameter 61 between ¾ inch and 1 inch (0.0191 m-0.0254 m). However, other diameters 61 are within the contemplation of this disclosure. The boss 64 is generally non-cylindrical and extends radially outward from the base portion 62 relative to axis 15 along axis 68. The example boss 64 also includes flats 70 defining linear portions of the boss 64 such that the boss 64 prevents rotation of the base component 60 relative to the fan case 30 and spool component 80 (shown in FIG. 3B) when installed in the fan case assembly 26, as shown in further detail in FIG. 4. The example boss 64 is generally oval shaped. As appreciated, this disclosure contemplates any shape boss 64 which prevents relative rotation of the base component 60.

The example base component 60 further includes a cylindrical portion 66 extending radially outward from the boss 64 relative to axis 15 along axis 68. An opening 72 is defined about axis 68 and extends the entire length of the cylindrical portion 66 and at least partially into the boss 64, as shown in further detail in FIG. 4. The opening 72 is sized to receive a bolt, or other attachment component, for attaching external components 24 (shown in FIG. 1) to the mount attachments 32.

The example cylindrical portion 66 includes a threaded outer surface 74 and a threaded inner surface 76. The threaded outer surface 74 and threaded inner surface 76 correspondingly mate with threaded surfaces of other components of the mount attachment 32, as will be shown in greater detail below.

Referring to FIG. 3B, with continued reference to FIG. 2, the mount attachment 32 includes a spool component 80 having a first end 82, second end 84, and central portion 86 between the first end 82 and the second end 84. The spool component 80 extends a length 81 along axis 68. The length 81 of the example spool component 80 is 1 inch (0.0254 m). However, other lengths are contemplated by the disclosure. In one example, the central portion 86 is generally cylindrical and includes an inner surface 88 defining an opening 90 along axis 68 extending from the first end 82 to the second end 84. Opening 90 is sized to receive the cylindrical portion 66 of the base component 60. As appreciated, the central portion 86 may have a different shape, such as hexagonal, to aid installation.

The first end 82 and the second end 84 of the example spool component 80 each include generally circular first and second discs 92, 94 respectively. Discs 92, 94 have a greater diameter 104 than the central portion 86 and include openings 96 having a greater diameter than opening 90. The example discs 92, 94 have a diameter 104 between ¾ inch and 1 inch (0.0191 m-0.0254 m). However, other diameters 104 are within the contemplation of this disclosure. First disc 92 includes a mounting surface 98 for mounting brackets, or other components, for attaching external components 24 to the mount attachment 32, as will be shown in greater detail below.

In one example, first disc 92 includes slots 102 at a radial outer edge relative to axis 68. Slots 102 are used with a tool (not shown) for mating the threaded inner surface 88 of the spool component 80 with threaded outer surface 74 of the cylindrical portion 66 of the base component 60. The slots 102 allow application of torque between the spool component 80 and the base component 60.

Referring to FIG. 3C, with continued reference to FIG. 2, the mount attachment 32 includes an example helical insert 110 having a threaded outer surface 112 and an inner surface 114. The inner surface 114 of the example helical insert 110 defines an opening 116 sized to receive a bolt, or other attachment component, for attaching external components 24 (shown in FIG. 1) to the mount attachment 32. The example helical insert 110 is sized to fit into the opening 72 defined by the inner surface 76 of the cylindrical portion 66 of the base component 60.

Referring to FIG. 4, with continued reference to FIGS. 2 and 3A-3C, the example mount attachment 32 is attached to the fan case 30. The base portion 62 and boss 64 of the base component 60 are disposed in a counterbored area 71 between the inner surface 34 and the outer surface 36 of the fan case 30. A counterbored area 71 is provided in the fan case 30 for receiving the base portion 62 and the boss 64. The counterbored area 71 begins at the outer surface 36 extends radially inward through the inner surface 34. The example counterbored area 71 has a profile to match the profile of the base portion 62 and boss 64. The base portion 62 sits flush with the inner surface 34 and is disposed such that the inner surface 34 is not raised or protruding. A combination of a liner 120 and a honeycomb core 123 seal against the fan case 30 and may be disturbed by any raised or protruding portion of the inner surface 34. The liner 120 and honeycomb core 123 seals the base component in the counterbored area 71 and provides a consistent inner surface 34 of the fan case 30. However, it is within the contemplation of this disclosure to include a liner 120 without a honeycomb core 123 to seal against the fan case 30. The base portion 62 disposed radially inward of the inner surface 34 relative to axis 15 allows the liner 120 and the honeycomb core 123 to be secondarily bonded after installation of the mount attachment 32 fan case assembly 26. The liner 120 typically is attached to honeycomb core 123 disposed radially inward of the liner 120. The flats 70 defining linear portions of the boss 64 prevent rotation of the base component 60 relative to the fan case 30 as well as the spool component 80. The boss 64, in conjunction with the profile of the counterbored area 71, prevents rotation due to its non-cylindrical profile which prevents the base component from rotating when disposed in the counterbored area 71.

The example spool component 80 is attached to the cylindrical portion 66 of the base component 60 by mating of the threaded inner surface 88 of the spool component with the threaded outer surface 74 of the cylindrical portion 66, as shown in threaded section 122. In one example, threaded section 122 is a ½ inch thread. However, other sized threads are contemplated. When spool component 80 is attached to the base component 60, the second disc 94 is clamped onto the outer surface 36 of the fan case 30. The load at threaded section 122 prevents damage to honeycomb radially inwards of the inner surface 34 relative to axis 15 due to any incidental loads on the mount attachment 32 during assembly, shipment, or use.

The opening 72 defined by the example base component 60 is sized to receive a bolt and extends through the cylindrical portion 66 and at least partially into the boss 64. When installed, the bolt will be disposed in the opening 72, as well as extending through an example helical insert 110. By extending at least partially into the boss 64, a portion 124 of the opening 72 sites below the outer surface 36 of the fan case assembly 26. Thus, external components 24 (Shown in FIG. 1) are mounted closer to the outer surface 36 than traditional threaded fasteners.

The boss 64 and the cylindrical portion 66 define a shoulder 128 such that a portion of the fan case 30 is disposed on the shoulder 128 and separates second disc 94 of the spool component 80 and the boss 64. Thus, the spool component 80 clamps to the fan case assembly 26 and not the boss 64.

The example helical insert 110 is attached to the cylindrical portion 66 of the base component 60 by mating of the threaded outer surface 112 of the helical insert 110 with the threaded inner surface 76 of the cylindrical portion 66, as shown in threaded section 126. In one example, threaded section 126 is a ¼ inch thread. However, other sized threads are contemplated. The helical insert 110 contacts the bolt and prevents damage from the bolt to the base component 60.

In one example, the spool component 80 and base component 60 are composed of steel or aluminum. However, other material compatible with environmental requirements are also within the contemplation of this disclosure.

Figure 5:
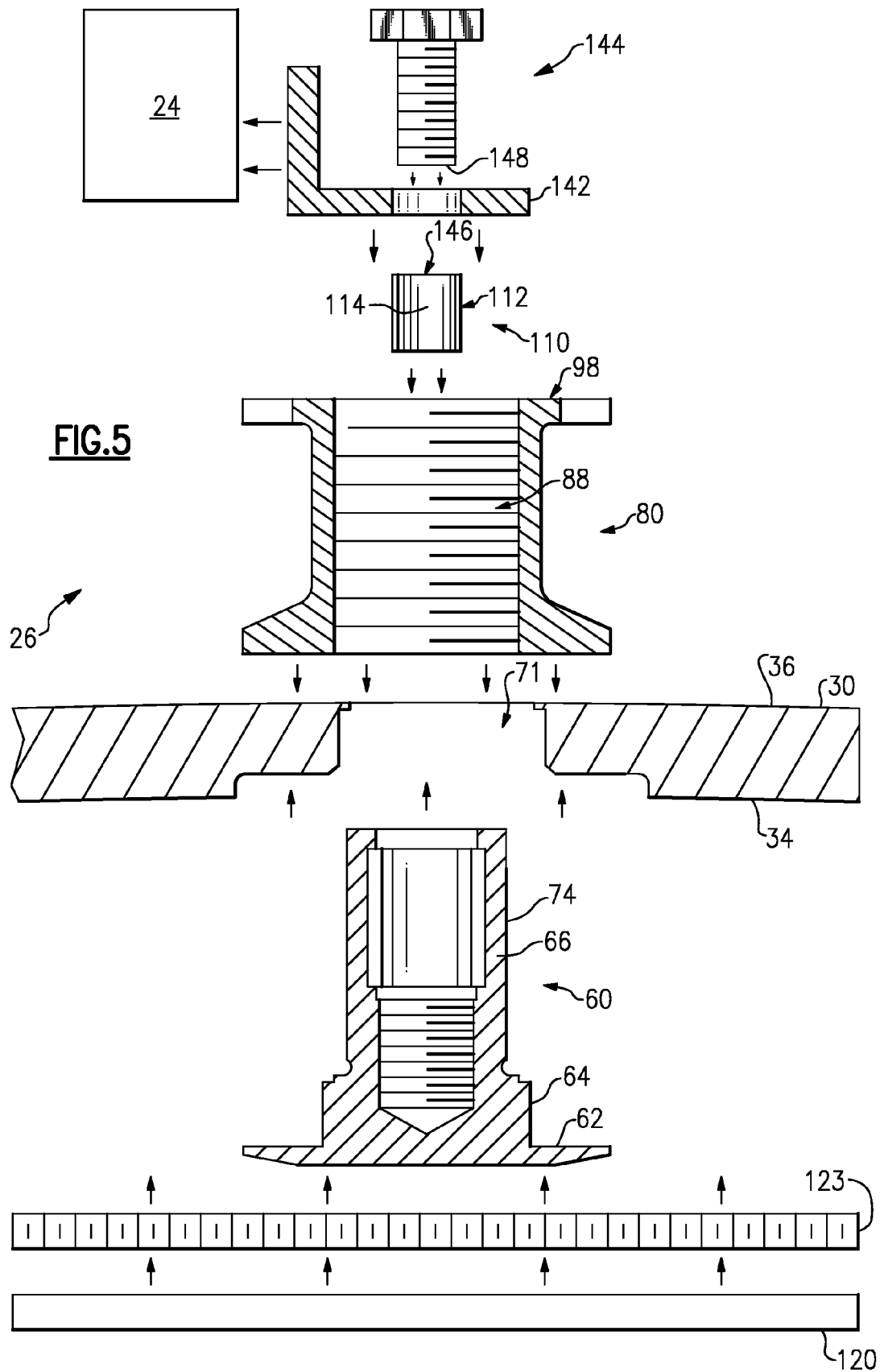
FIG. 5 is an example method of installing a mount attachment on a fan case assembly.

Referring to FIG. 5, with continued reference to FIG. 4, a method of installing a mount attachment 32 on a fan case assembly 26 is shown. A fan case assembly 26 includes a fan case 30. A counterbored area 71 is formed through the fan case 30. The profile of the counterbored area 71 is similar to the profile of the base component 60. The base component 60 is then inserted such that the base portion 62 and boss 64 are disposed in the counterbored area 71 of the fan case 30.

The spool component 80 is attached to the base component 60 by mating the threaded inner surface 88 of the spool component 80 with the threaded outer surface 74 of the cylindrical portion 66 of the base component 60 such that the spool component 80 and the base component 60 are mechanically locked in place and do not rotate relative to one another. The spool component 80 is threaded onto the base component 60 until the spool component 80 generates a compression force on the outer surface 36 of the fan case 30.

A honeycomb core 123 and a liner 120 are then bonded to the inner surface 34 of the fan case 30, except in the counterbored area 71. The liner 120 and honeycomb core 122 seal the base component 60 between the inner surface 34 and the honeycomb core 123. The liner 120 and honeycomb core 123 also provide a consistent inner surface relative to the rest of the inner surface 34 of the fan case 30.

The helical insert 110 is then attached to the base component 60 by mating the threaded outer surface 112 of the helical insert 110 with the threaded inner surface 76 of the cylinder portion 66 of the base component 60 such that the helical insert 110 and base component 60 are mechanically locked in place. The helical insert 110 is disposed within the opening 72 of the cylinder portion 66.

An example accessory 142, such as an L bracket, is then aligned on the mounting surface 98 of the spool component 80. A threaded member, such as a bolt 144, or other attachment component, passes through the bracket 142 to attach the bracket 142 to the mounting surface 98 of the spool component 80. The bolt 144 is further inserted into the opening 72 of the cylindrical portion 66 of the base component 60 and through an opening 146 defined by the inner surface 114 of the helical insert 110 until an insertion end 148 of the bolt 144 is disposed at the end of the opening 72 in the boss 64 of the base component 60.

The example bracket 142 is then attached to external components 24 (shown schematically), such as an electrical case as known in the art.

By utilizing the mount attachment 32 in the manner described, the bracket 142, bolt 144, helical insert 110, and spool component 80 are all independently removable and replaceable without disturbing the base component 60. By not requiring replacement of the base component 60, potential damage to the honeycomb or liners below the fan case 30 during installation, repair, or removal is minimized.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A composite fan case assembly comprising:
a composite fan case body disposed on an axis having a radially inner surface and a radially outer surface; and
at least one mounting attachment for receiving a threaded member including:
a base component extending through an opening in the fan case body, said opening from said radially outer surface and toward said radially inner surface of said fan case body, said base component including a base portion, a boss having a non-cylindrical profile, and a cylindrical portion;
a spool component disposed on said radially outer surface and attached to the base component, said spool component receiving at least a portion of the base component, wherein an outer surface of the cylindrical portion and an inner surface of the spool component are threaded and correspondingly mate to lock the spool component relative to the base component.

2. The composite fan case assembly of claim 1, including a helical insert having a threaded outer surface wherein the threaded inner surface of the cylindrical portion receives the helical insert to lock the helical insert relative to the base component.

3. The composite fan case assembly of claim 2, further including a threaded member inserted into the helical insert and said threaded inner surface of the cylindrical portion.

4. The composite fan case assembly of claim 2, wherein the threaded inner surfaces of the cylindrical portion extends the entire length of the cylindrical portion.

5. The composite fan case assembly of claim 4, wherein the threaded inner surface of the cylindrical portion extends at least partially into the boss.

6. The composite fan case assembly of claim 1, wherein the spool component includes a first disc contacting the radially outer surface of the fan case body such that the spool component is clamped on the outer surface of the fan case body.

7. The composite fan case assembly of claim 6, wherein the boss and the cylindrical portion define a shoulder wherein a portion of the fan case body is disposed on the shoulder such that the spool component is separated from the boss.

8. The composite fan case assembly of claim 7, further comprising a second disc radially outwards of the first disc defining a mounting surface for an accessory.

9. The composite fan case assembly of claim 8, wherein the accessory is a bracket.

10. The composite fan case assembly of claim 1, wherein the boss includes flats defining generally linear portions of the boss.

11. The composite fan case assembly of claim 10, wherein the flats on boss engage a corresponding part of the opening in the fan case body to prevent relative rotation of the base component to the fan case body and the spool component.

12. A mounting attachment for being attached to a composite fan case assembly in a gas turbine engine comprising:
a base component extending through an opening in the fan case, said opening from a radially outer surface and toward a radially inner surface of said fan case, said base component including a base portion having a circular profile, a boss having a non-cylindrical profile, and a cylindrical portion;
a spool component disposed on said radially outer surface and attached to the base component having a first end in contact with the fan case and a second end radially outward of the first end, the spool component having a threaded inner surface receiving at least a portion of a threaded outer surface of the cylindrical portion to lock the spool component relative to the base component;
a helical insert having a threaded outer surface received by a threaded inner surface of the base component to lock the helical insert relative to the base component; and
a threaded member extending through the helical insert and inner surface of the base component and attaching an accessory to the second end of the spool component.

13. The mounting attachment of claim 12, wherein the spool component includes a central portion, wherein a first disc is disposed on the first end of the spool component and a second disc opposite the first disc is disposed on the second end of the central portion.

14. The mounting attachment of claim 13, wherein the second disc includes at least one slot for providing torque to mate the spool component to the base component.

15. The mounting attachment of claim 14, wherein a diameter of the first disc and a diameter of the second disc is equivalent to a diameter of the base portion.

16. The mounting attachment of claim 15, wherein the diameter of the first disc, the diameter of the second disc, and the diameter of the base portion are 1 inch (0.0254 m).

17. A method of attaching a mounting attachment to a composite fan case in a gas turbine engine comprising the steps of:
   inserting a base component into the composite fan case, wherein a base portion and a non-cylindrical boss extending radially outward of the base portion are disposed between an inner surface and an outer surface of the composite fan case;
   mating a spool component having a threaded inner surface with a threaded outer surface of a cylindrical portion of the base component, wherein the cylindrical portion extends radially outward of the boss; and
   mating a helical insert having a threaded outer surface onto a threaded inner surface of the base component.

18. The method of claim 17, further comprising the step of inserting a bolt through the base component, and helical insert.

19. The method of claim 17, wherein the spool component is mated with the base component until the spool component is clamped to the outer surface of the composite fan case.

20. The method of claim 17, further comprising the step of sealing the base component between an inner surface of the fan case and a liner disposed radially inward of the base component.

* * * * *